(12) United States Patent
Carroll et al.

(10) Patent No.: US 7,685,175 B2
(45) Date of Patent: Mar. 23, 2010

(54) CONTENT MANAGER

(76) Inventors: Michael Lee Carroll, 95 Clearview Dr., Springboro, OH (US) 45066; Paul Thomas Schweizer, 237 Wonderly Ave., Dayton, OH (US) 45419

( * ) Notice: Subject to any disclaimer, the term of this patent is extended or adjusted under 35 U.S.C. 154(b) by 757 days.

(21) Appl. No.: 11/502,097

(22) Filed: Aug. 10, 2006

(65) Prior Publication Data

US 2007/0038687 A1 Feb. 15, 2007

Related U.S. Application Data

(60) Provisional application No. 60/707,733, filed on Aug. 12, 2005.

(51) Int. Cl.
  *G06F 12/00* (2006.01)
  *G06F 17/30* (2006.01)
(52) U.S. Cl. .............. 707/204; 707/100; 707/101; 707/102; 707/202; 711/161; 711/162
(58) Field of Classification Search ............... None
  See application file for complete search history.

(56) References Cited

U.S. PATENT DOCUMENTS

| | | | |
|---|---|---|---|
| 5,584,006 A | 12/1996 | Reber et al. | |
| 5,659,742 A | 8/1997 | Beattie et al. | |
| 5,721,916 A * | 2/1998 | Pardikar | 707/201 |
| 5,761,655 A | 6/1998 | Hoffman | |
| 5,764,972 A * | 6/1998 | Crouse et al. | 707/1 |
| 5,895,464 A | 4/1999 | Bhandari et al. | |
| 7,243,105 B2 * | 7/2007 | Thint et al. | 707/101 |
| 7,287,048 B2 * | 10/2007 | Bourbonnais et al. | 707/204 |
| 7,389,311 B1 * | 6/2008 | Crescenti et al. | 707/204 |
| 7,454,406 B2 * | 11/2008 | Kaplan et al. | 707/2 |
| 2002/0194194 A1 | 12/2002 | Fenton et al. | |
| 2002/0194195 A1 | 12/2002 | Fenton et al. | |
| 2003/0033296 A1 | 2/2003 | Rothmuller et al. | |
| 2003/0187866 A1 * | 10/2003 | Zelenka | 707/102 |
| 2004/0098379 A1 | 5/2004 | Huang | |
| 2004/0162845 A1 | 8/2004 | Kim et al. | |
| 2004/0193600 A1 | 9/2004 | Kaasten et al. | |
| 2004/0204949 A1 * | 10/2004 | Shaji et al. | 705/1 |
| 2005/0033657 A1 | 2/2005 | Herrington et al. | |
| 2005/0033758 A1 | 2/2005 | Baxter | |
| 2005/0192985 A1 * | 9/2005 | Tsuchiya | 707/100 |
| 2005/0201254 A1 | 9/2005 | Looney et al. | |
| 2005/0232210 A1 | 10/2005 | Karaoguz et al. | |
| 2005/0234981 A1 | 10/2005 | Manousos et al. | |
| 2006/0036568 A1 | 2/2006 | Moore et al. | |

\* cited by examiner

*Primary Examiner*—Tim T. Vo
*Assistant Examiner*—Jay A Morrison
(74) *Attorney, Agent, or Firm*—Thomas E Lees, LLC

(57) ABSTRACT

An archive for digital content comprises archive storage, an archive service and a manifest. The archive storage is a unified storage structure for storing items, such a directory having a plurality of subdirectories. The manifest is stored within the archive storage when the archive storage is loaded onto a storage device, and comprises an index of items stored in the unified structure of the archive, an organizational structure that supports defined categories that characterize items stored in the unified structure and at least one backup queue that temporarily queues a list of items that satisfy predetermined backup criteria by have not been backed up. The archive service serves as an intermediate between users, e.g., operators, software modules, programs, services, etc., and the archive storage to control requests for access to items stored in the unified storage structure.

20 Claims, 7 Drawing Sheets

CONTENT MANAGER

CROSS REFERENCE TO RELATED APPLICATION

This application claims the benefit of U.S. Provisional Patent Application Ser. No. 60/707,733, filed Aug. 12, 2005 entitled "PHOTOGRAPHIC IMAGE EDITING AND ORGANIZATION SOFTWARE", the disclosure of which is hereby incorporated by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

The present invention relates to computer methods, systems and computer program products that collect, store, organize, archive, catalog, retrieve and/or manage digital content.

It is often desirable to capture and organize digital photographs, images, audio, video and other types of digital media files to preserve important memories, to secure data and/or to retain representations of events or objects of interest. In this regard, digital cameras, scanners, camcorders and other devices allow users the ability to capture, download and store such digital content on a general purpose personal computer (PC). However, there is typically no consistency or standard in how each device locates, organizes and stores its digital content within the directory structure of the user's computer. Often times, the organization of the corresponding media files is left to the discretion of the user.

Moreover, if the user's computer has access to a network, e.g., the Internet, the user can search for media files and download such content onto their computer. Again however, the organization and location of downloaded media files is often left to the discretion of the user. A computer can accumulate a substantial amount of digital media files in the above manners, and as such, there is the potential that such digital content is not well organized and thus cumbersome to secure, locate and/or retrieve.

Software products are currently available that attempt to assist users in organizing media by providing disk indexers. Disk indexers typically scan a hard disk to identify and index the location of images, sound, and video files, etc., located on the hard disk during the scan. The media files themselves are not moved or reorganized. Accordingly, the disk indexer also typically provides software that attempts to keep the created index and the actual contents of the corresponding hard disk in sync with each other. However, in practice, it is quite easy to confuse the indexer software, e.g., by relocating the files on the hard disk, so that the index loses track of the actual location of some of the media files. Moreover, the index and corresponding data are typically stored in one or more database files. Database files are inherently proprietary formats. If the user loses access to the database program of the corresponding disk indexer, the information in the database file likely becomes inaccessible. The database program of the disk indexer is also often effectively lost if copied (or restored) to a machine that is not licensed to use the database of the disk indexer.

BRIEF SUMMARY OF THE INVENTION

The various embodiments of the present invention allow a user to collect, store, organize, archive, catalog, retrieve and/or manage digital content.

An archive for digital content comprises archive storage, an archive service and a manifest. The archive storage is a unified storage structure for storing items, such a directory having a plurality of subdirectories. The manifest is stored within the archive storage when the archive storage is loaded onto a storage device, and comprises an index of items stored in the unified structure of the archive, an organizational structure that supports user-defined categories that characterize items stored in the unified structure and at least one backup queue that temporarily queues a list of items that meet predetermined backup criteria. The items listed in each backup queue remain in their corresponding backup queue until a backup of that item has been completed. The archive service serves as an intermediate between users, e.g., operators, software modules, programs, services, etc., and the archive storage to control requests for access to items stored in the unified storage structure.

BRIEF DESCRIPTION OF THE SEVERAL VIEWS OF THE DRAWINGS

The following detailed description of the preferred embodiments of various embodiments of the present invention can be best understood when read in conjunction with the following drawings, where like structure is indicated with like reference numerals, and in which.

DETAILED DESCRIPTION OF THE INVENTION

In the following detailed description of the illustrated embodiments, reference is made to the accompanying drawings that form a part hereof, and in which is shown by way of illustration, and not by way of limitation, specific embodiments in which the invention may be practiced. It is to be understood that other embodiments may be utilized and that changes may be made without departing from the spirit and scope of various embodiments of the present invention.

Figure 1:
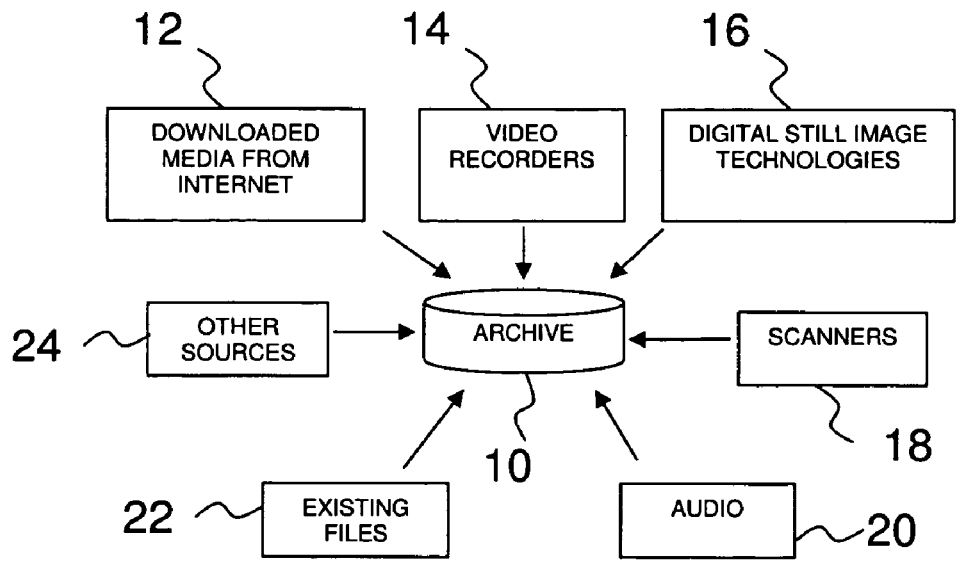
FIG. 1 is a block diagram of an archive illustrating examples of digital content that can be archived according to an aspect of the present invention.

Referring now to the drawings, and particularly to FIG. 1, an archive 10 is utilized to collect, store, organize, archive, catalog, retrieve and/or manage digital content. Exemplary digital content may include, but is not limited to, downloaded or otherwise electronically transferred digital media 12, e.g., music, images, photographs, video etc., downloaded across a network such as the Internet; digital video content 14, e.g., RM, MOV, MPG, etc., files from a video recorder, camcorder or other device that renders video to digital form; digital photographs and other digital images, such as JPG, TIFF, GIF, etc., files from digital still image technologies 16 including digital cameras; digital content from scanners, facsimile machines, all-in-one and similar devices 18; digital audio 20, such as WAV, MP3, AIF, AU, WMA, etc., files; existing digital information 20 and other sources 24. The other sources 24 may comprise for example, files that are created to describe collections of the digital content within the archive 10, e.g., in the form of albums, scrapbooks, a manifest, notes, journals and other types of files, examples of which will be described in greater detail herein.

Conceptually, the archive 10 may be considered as a unitary "archive" folder, which may be maintained on a single storage device or distributed across multiple storage devices. Within the archive folder is a set of folders (and subfolders). These folders contain all of the original digital content, e.g., images, video, audio, etc. Further, the folders may store revisions of original digital content, descriptions of the digital content and tools to backup, sort, classify, locate and/or retrieve desired items of content, including for example, sort boxes, albums, journal boxes, timeline search tools, etc.

Figure 2:
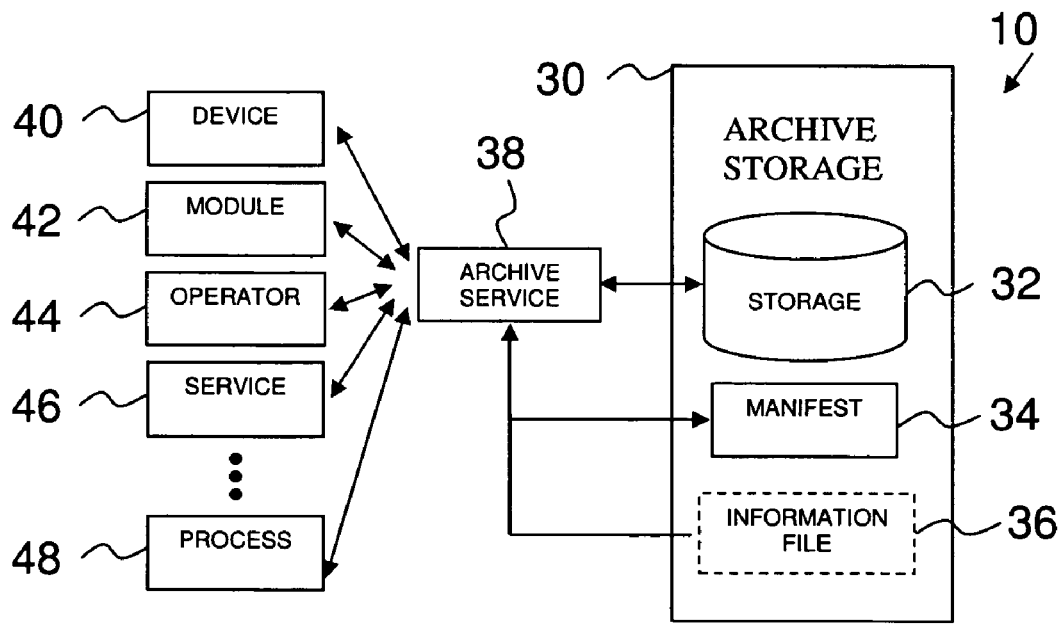
FIG. 2 is a block diagram of users interacting with the archive of FIG. 1 through an archive service.

Referring to FIG. 2, one exemplary implementation of the archive 10 comprises an archive storage area 30 for storing items, which is characterized by a unified storage structure 32 and a manifest 34. The unified storage structure 32 includes an archive folder and any corresponding subfolders. All items associated with the archive 10 are copied into the archive storage area 30, and are logically contained within the unitary archive folder (or a corresponding subfolder thereof). Moreover, when copying digital content into the archive 10, the original source information may be left unaltered and not damaged or deleted, thus preserving the underlying data.

The archive 10 may be periodically accessed to perform routine maintenance, e.g., by performing backups and by running diagnostics to ensure that the digital content is maintained in serviceable condition. Due at least in part to the unified storage structure 32, a backup may conveniently save everything necessary to completely restore the archive 10 or a portion thereof, even if the original archive information becomes damaged or lost. Additionally, the unified storage structure 32 allows, for example, easy upgrade to a new computer or to move the software and archive storage area 30 to a different computer or storage location.

The archive storage area 30 is a dedicated storage area and may be implemented, for example, as a primary directory (and subdirectories) on a storage medium in communication with a corresponding host processing device. Alternatively, a system based upon compressed formats, database formats, or other custom or open standard formats may be implemented.

The archive storage area 30 may be stored on one or more storage medium(s), which may comprise, for example, a fixed disk or disk array within or otherwise connected to the host processing device, e.g., a conventional hard disk or RAID configured disks, a shared resource such as a network attached storage device, a removable or otherwise swappable storage medium, e.g., a Universal Serial Bus enabled storage device, a Firewire enabled device, an Ethernet enabled device, etc.

According to an aspect of the present invention, the user does not need to manage the storage structure 32, the archive storage area 30, or any other aspect of the archive 10. Rather, the archive storage area 30 may be considered a 'black box' in this respect, if the user so desires. Users place items into the archive and retrieve items from the archive, but how the archive arranges these files may not be known or fully understood by the user. In this regard, search tools and other aids may be associated with the archive 10 to allow a user to identify and locate items of interest. Exemplary searching and browsing tools will be described in greater detail herein. Alternatively, information may be provided with regard to the internal structure of the archive 10 for those users who are interested or require an understanding of the organization of the archive 10.

The archive storage area 30 may optionally be marked as a "special" directory, e.g., to provide a layer of protection to the storage structure 32. The manner in which the storage structure 32 is marked as special (if marked at all) will depend upon a number of factors, such as the characteristics of the host processing device. For example, if the host processing device is operating under the Microsoft Windows operating system by Microsoft Corporation of Redmond Washington, the storage structure 32 may be marked as special using suitable Windows shell extensions. For example, the Windows operating system allows software to extend the shell, e.g, Windows Explorer, to create areas of the disk that behave differently than normal directories.

Alternatively, an optional information file 36 such as a 'readme' file may be utilized to mark the storage structure 32 as a special directory. The optional information file 36 may be stored for example, at a known or otherwise specified location within the storage structure 32. The optional information file 36 may be utilized, for example, to inform the user to be careful when making changes to the directory structure of the archive storage area 30.

The manifest 34 may be stored, for example, at a known or otherwise specified location within the archive storage area 30 and provides an index to the content items and other information associated with the archive 10. The manifest 34 may further provide additional information for support, maintenance and usage of the archive 10 and its contents. The manifest 34 will be described in greater detail herein.

An archive service 38 is provided to serve as an intermediate between the items stored in the archive storage area 30 and corresponding interacting users, which may comprise for example, hardware devices 40, software applications and modules 42, human operators 44, software services 46 and/or other hardware or software processes 48. In addition to handling requests from users for access to items stored in the archive storage area 30, the archive service 38 updates and maintain the manifest 34 and may handle maintenance and administrative tasks associated with maintaining the archive.

As noted above, the user of the archive 10 need not know either the internal structure of the archive storage area 30 or its storage location. In this regard, the archive service 38 may be used to shield all the implementation details of the archive 10 from the corresponding interacting user, e.g., an application or human user requesting access to a particular archived item. Moreover, the archive service 38 may support an interface for providing searching, browsing and other tools to facilitate user interaction with the archive 10.

Depending upon the specific implementation of the archive 10, the archive service 38 may require that a user "register" file formats that it is unfamiliar with, e.g., using a suitable interface. Such may be desirable where, for example, the runtime addition of new file formats is desired/required or where the archive service 38 cannot determine how to process a particular file, etc.

The archive service 38 may be written in any suitable language. For example, if operating under above mentioned Microsoft Windows operating system, the archive service 38 may be written in C# and may be shared by loading Net assemblies into a common EXE file. Further the archive service 38 may be accessed via a remote procedure call interface across a process/network boundary, which is suitable for shared access by many processes to a common shared archive storage area 30. Correspondingly, the archive storage area 30 may be implemented to support single or multiple users, e.g., using standard multi-user access methods for shared resources.

Figure 3:
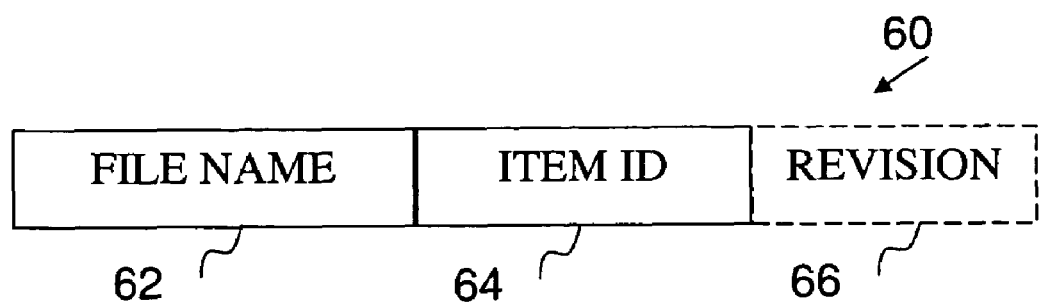
FIG. 3 is an illustration of an exemplary naming structure for items stored in an archive.

Referring to FIG. 3, items 60 that are stored in the archive storage area 30 may include a file name 62, an item identification (hereinafter Item ID) 64 and optionally, an indication of a revision 66. The file name 62 is any conventional filename, which may include a file designation and optionally, a period (".") and a three character extension. According to an aspect of the present invention, all items in the archive storage area 30 have an item ID 64, which provides a unique identifier. As an example, the item ID 64 may comprise a simple function, e.g., a numeric or alphanumeric designation appended to or otherwise concatenated with the original file name 62 of a corresponding file. If an original filename 62 and item ID 64 are already used, a counter or other suitable logical arrangement may be used to adjust, e.g., increment or decrement, the item ID 64 of the current item to be saved. As such, the names of a given item's files are a function of the corresponding item ID.

Some item types, e.g., digital images, can have zero to multiple revisions. In one exemplary implementation, all indications of revision 66 are referenced under their corresponding original item. The filename of a revision is a function of an assigned revision code, e.g., a revision number and the corresponding Item ID 64. Thus, the Item ID may be determined from the revision name.

Figure 4:
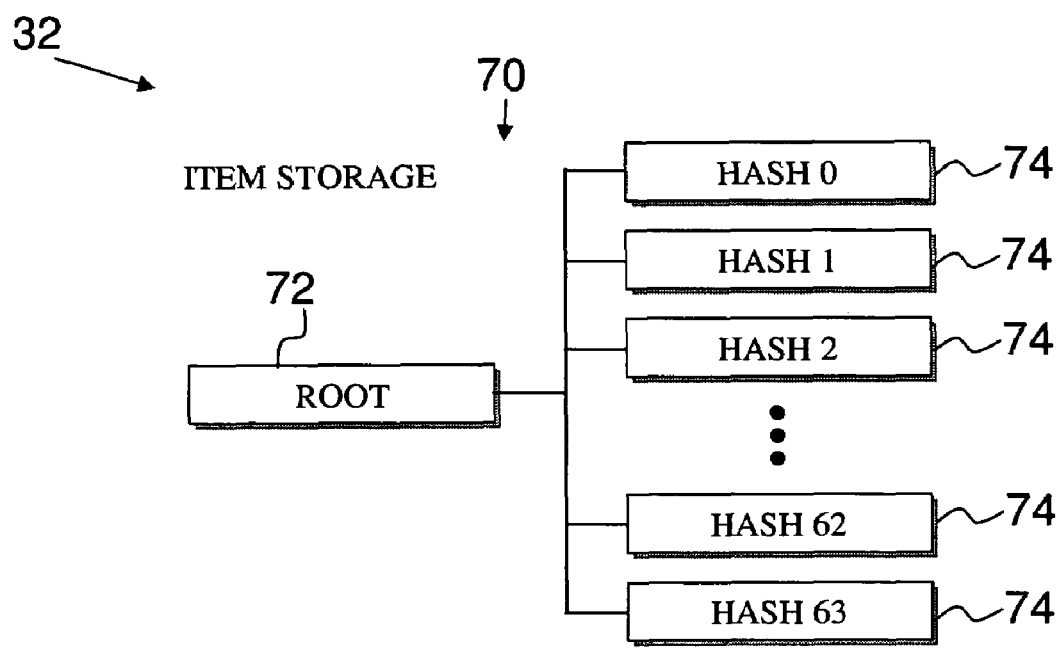
FIG. 4 is a block diagram of an exemplary hashed item storage structure according to an aspect of the present invention.

Referring to FIG. 4, the storage structure 32 of the archive storage area 30 may comprise a hashed directory structure 70. The hashed directory structure 70 comprises a root directory 72 and a 64 way sub-directory as shown. The sub-directory 74 is determined, for example, by using the modulus 64 of a corresponding hash function. The subdirectory 74 could alternatively consist of any other number of hashed directories.

According to an exemplary implementation of the storage structure 32, an item is stored in one of the item subdirectories and the name of this subdirectory is a hash on the item's ID 64. For example, a subdirectory may be named based upon a .Net hash of the string that is the item ID/revision 64, 66. The standard Microsoft .Net version 1 string hash function (or any other suitable has function) may be utilized. Moreover, other naming conventions may be implemented. However, if the hash function is a strict function of the filename and no other information, the location of the item may be determined independently of the other content or the state of the archive storage area 30.

That is, when items are stored within the archive storage area 30, a hash function is applied to the item ID 64 (which is a function of the original file name 62). This hash is then used to determine where in the archive storage area 30 the file will be located. If a first item is already stored at an indicated location, the keys of the previously stored item and the current item are compared. If the keys hash to the same value, then an alternative storage location may be selected for the newer item.

The hashed directory structure 70 need not be implemented on a single physical storage device. Rather, the hashed directory structure 70 may be spread out across different physical storage devices. Hashing files over multiple storage devices may provide a relatively even use of storage resources and access bandwidth of the host processing device. A hashing scheme is not necessary. However, distinguishing the digital content using hashing or other key-based or index-based schemes may provide for relatively rapid access to items in the archive storage area 30, especially as the number of items grows.

Figure 5:
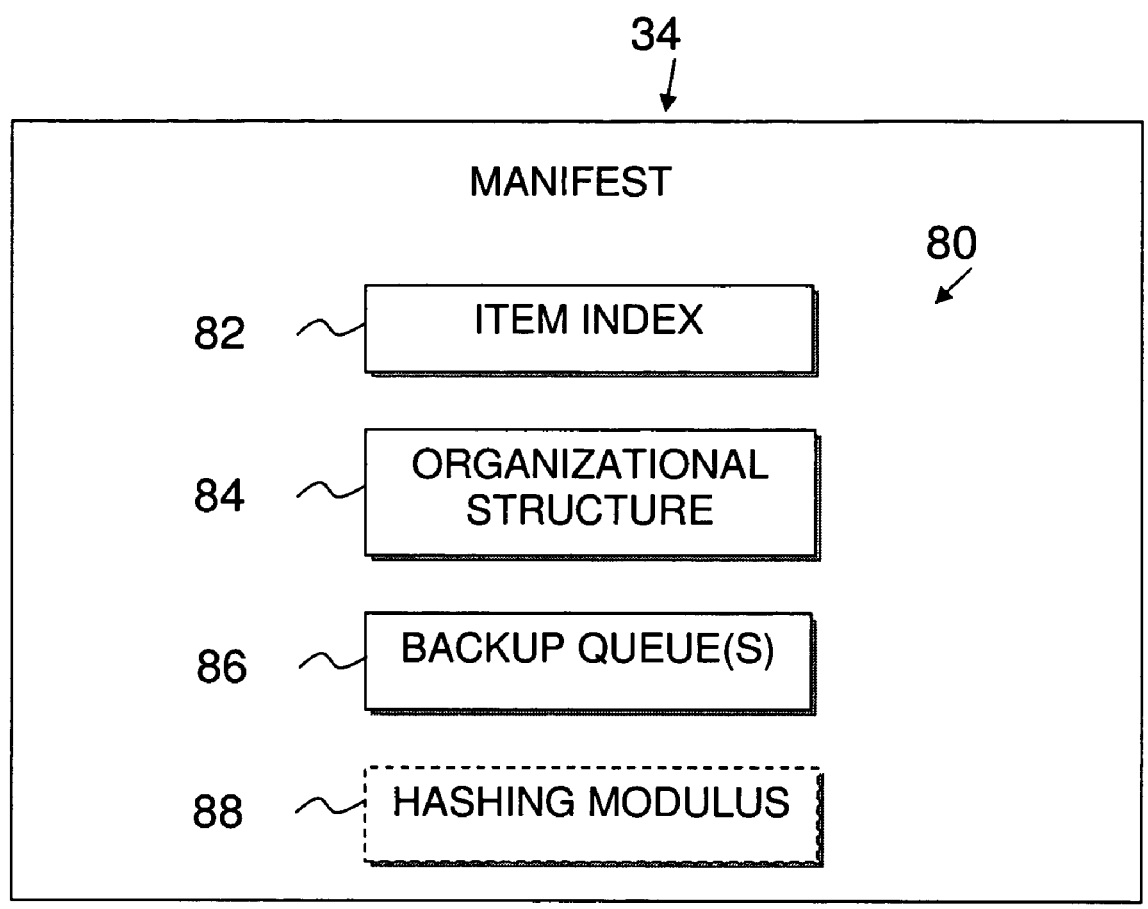
FIG. 5 is a block diagram illustrating exemplary contents of a manifest according to an aspect of the present invention.

The manifest 34 describes the archive storage area 30 and the locations of its item contents. The manifest 34 may also store information regarding special processing capabilities of the archive, e.g., that may be used to sort, backup, organize, describe or otherwise characterize the stored items. Referring to FIG. 5, an exemplary implementation of the manifest 34 comprises a manifest structure 80 that supports an item index 82, an organizational structure 84, one or more backup queues 86 and optionally, a hashing modulus 88 that is used for the hashing function described with reference to FIG. 4.

The manifest 34 may be constructed and maintained in an open standard format such as the extended markup language (XML). Such use of standard formats provides transparency in that proprietary software applications are not required to read the manifest 34. Thus, for example, a user may read the manifest using any XML capable program to locate a file of interest. Moreover, the use of an appropriate industry standard format(s) to construct the manifest 34 makes the archive robust and allows future applications as well as third party applications the ability to interact with the archive 10.

The archive service 38 maintains the manifest 34. As files are added to and/or edited and/or removed from the archive storage area 30, the manifest 34 is updated by the archive service 38 to properly identify the contents of the archive storage area 30. The archive service 38 may also utilize the manifest 34 to keep track of item revisions. The use of the manifest 34 further provides a health check for the archive storage area 30. By matching files actually in the archive storage area 30 with the contents of the manifest 34, it is possible to detect when files in the archive storage area 30 are missing or when extra files in the archive storage area 30 exist.

According to one aspect of the present invention, when the archive service 38 saves the manifest 34, the entire manifest 34 is saved. This may be performed, for example, as an atomic operation. A copy of the current state of the manifest 34 may be saved to a file upon an occurrence of a predetermined event, such as when a predetermined number of changes have been made to the state of items in the archive storage area 30 and/or when a predetermined period of time has elapsed. The manifest may be initially saved to a file that is 'next to' the current manifest file. Under this arrangement, when the entire save operation is complete, the newly saved manifest file replaces the previous manifest file. The previous manifest file may then be renamed to serve for example, as a backup manifest file. The above-described operation to save a manifest 34 may be implemented, from the perspective of the user, as a single operation.

Moreover, multiple generations of the manifest 34 may be saved. For example, a backup of the manifest may be stored when the manifest is saved. Still further, additional backups of the manifest 34 may be stored using a grandfathering backup system. Under this arrangement, a corrupted/missing manifest may be automatically recovered from the next available backup the next time the archive storage area 30 is loaded.

Psuedo code is presented below for an exemplary backup operation of the manifest 34 that illustrates the use of backup generations/grandfathering to maintain multiple backups of the manifest 34 captured at different times:

```
/// This class manages the naming and age of backup generations.
/// This allows many generations of a file to be maintained.
public class BackupGeneration
{
    private BackupGeneration   objPrevious = null;
    private int                nGeneration;
    private TimeSpan           tsAge;
/// Returns a backup generation that uses a standard timespan pattern.
    public static BackupGeneration StandardSpans ( )
    {
    TimeSpan[ ] spans = new TimeSpan[7];
    spans[0] = new TimeSpan (0L);           // Always rollover
    spans[1] = new TimeSpan (0L);
    spans[2] = new TimeSpan (0L);
    spans[3] = new TimeSpan (1, 0, 0, 0, 0);
    spans[4] = new TimeSpan (7, 0, 0, 0, 0);
    spans[5] = new TimeSpan (30, 0, 0, 0, 0);
    spans[6] = new TimeSpan (90, 0, 0, 0, 0);
    return new BackupGeneration (spans);
    }
    /// Returns a backup generation set based on the specified time spans.
    public BackupGeneration(TimeSpan[ ] Spans)
    {
       if (Spans.GetLength(0) < 2) throw new Exception ("There must be at least two time spans in the generation definition array.");
       tsAge = Spans[0];
       nGeneration = 1;
       objPrevious = new BackupGeneration (this, Spans);
    }
    /// Builds the next generation backup given a set of time spans.
    private BackupGeneration(BackupGeneration NextGen, TimeSpan[ ] Spans)
    {
       nGeneration = NextGen.Generation + 1;
       tsAge = Spans[nGeneration−1];
       if (nGeneration < Spans.GetLength(0))
          objPrevious = new BackupGeneration (this, Spans);
    }
    /// This is the public entry point to start the generational roll on a specified
    /// file. This file must exist for anything to happen.
    public bool RollGeneration (string Filename)
    {
       if (!File.Exists (Filename)) return false;
       return RollGeneration (Filename, new FileInfo(Filename));
    }
    /// This performs the real work of the generational backup system. If the
    /// file for this generation exists then an attempt is made to roll it to
    /// the previous (re: older) generation. In any case, the target file will
    /// not exist with it original name after this call.
    private bool RollGeneration (string BaseFilename, FileInfo ParentFile)
    {
       // If the file for this generation is not old enough, then the
       // generational roll stops here
       DateTime dt = ParentFile.LastWriteTime;
       TimeSpan ts = DateTime.Now.Subtract(dt);
       if (ts < tsAge) return false;
       // Roll this generations file back to the next oldest generation
       string sFile = ThisGenerationsFilename (BaseFilename);
       if ((objPrevious != null) && (File.Exists (sFile))) {
          FileInfo fiOld = new FileInfo (sFile);
          objPrevious.RollGeneration (BaseFilename, fiOld);
       }
       if (File.Exists (sFile)) FileSupport.SafeKill (sFile);
       File.Move (ParentFile.FullName, sFile); return true;
    }
    /// Given a specified base filename, this method returns a version of that
    /// file for the generation of this instance.
    private string ThisGenerationsFilename (string BaseFilename)
    {
       string sExt = Path.GetExtension (BaseFilename);
       string sBase = Path.GetFileNameWithoutExtension (BaseFilename);
       string sPath = Path.GetDirectoryName (BaseFilename);
       string sNewName = String.Format ("{0} - (Backup Generation {1}){2}", sBase, nGeneration, sExt);
       sNewName = Path.Combine (sPath, sNewName);
       return sNewName;
    }
}
```

Figure 6:
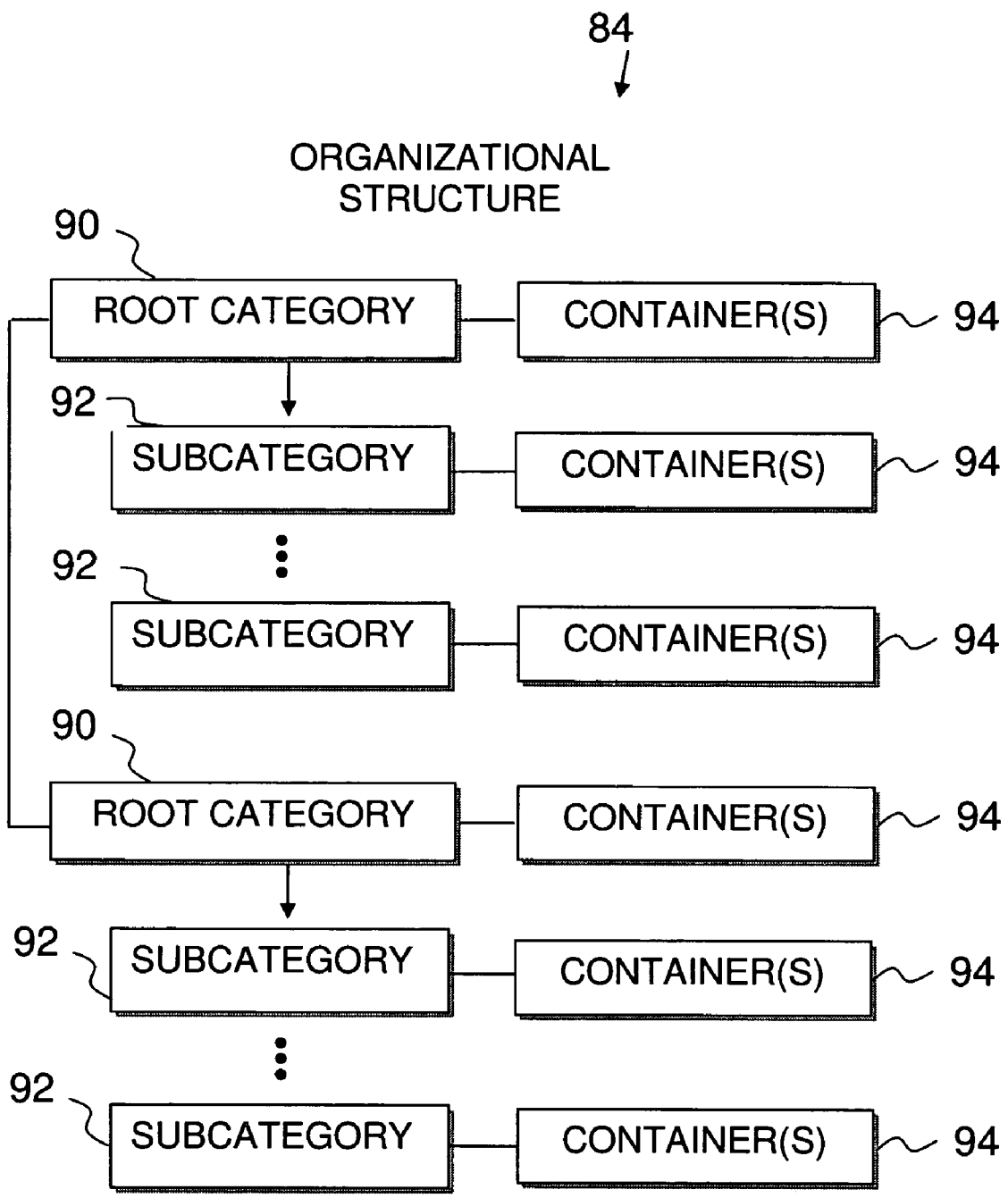
FIG. 6 is a block diagram illustrating an exemplary structure for user-defined definitions.

As noted above, the manifest 34 may maintain a user-defined organizational structure 84 that allows a user to customize, characterize and classify items stored in the archive storage area 30. Referring to FIG. 6, an exemplary organizational structure 84 comprises a definition of user-defined categories comprising one or more root categories 90. For each root category 90 there may be any number (including zero) of subcategories 92. This characterization can be extended by defining any-number of subcategories of subcategories, etc. For each root category 90 and subcategory 92, there may be any number (including zero) of container items 94.

Container Items 94 are items in the archive storage area 30 that are lists of other items. The can be many types, e.g., classes, of container items 94. As an illustrative example, an organizational structure 84 may be comprised of two root categories 90, such as an Organizer and a Bookshelf. There may be any number of subcategories 92 under each of the Organizer and a Bookshelf, depending upon the particular user application. Moreover, there may be two defined container items 94, such as folders and albums, each of which may be associated with one or more of the root categories 90 and subcategories 92.

The organizational structure 84 is not used to actually store items. Rather, the organizational structure 84 is a tool, e.g., as implemented through an interface via the archive service 38, that allows a user to have one or more different "views" of the items stored in the archive storage area 30 by maintaining corresponding lists of related or otherwise associated items. This allows the user to quickly find a desired item of interest.

The archive service 38 may provide a suitable interface so that a user can create, edit, maintain and delete root categories 90, sub-categories 92 and container items 94. Moreover, the archive service 38 may be used to allow a user to interact with the organizational structure 84 to identify items of interest that are stored in the archive storage area 30, such as by implementing visualizing, browsing and other software techniques.

The manifest 34 may further comprise a 'Check', which is a message digest of item list information and secret information. This allows the ability to throttle archive storage usage based on the activation state of the application and prevent tampering with the archive 10. The check is a checksum or message digest of the manifest contents. The archive service 38 can use this to detect if the manifest 34 has been changed by any other entity. The manifest 34 contains a count of the number of times the archive 10 has been opened by the user. The check prevents this counter from being changed. Therefore, the counter can be safely used to limit usage of the archive until the archive service 38 is properly activated.

A pseudo-code for an exemplary XML based manifest 34 is illustrated below for a sample archive that has been simplified for purposes of. illustration. The manifest code presented below includes a manifest format Version and Global unique ID GUID:

Version="AV1" ID="c895e151-dcf4-4c95-9660-41002b21f229"

The manifest code presented below also includes a checksum, which may be used for health checks as noted above. As illustrated, the checksum assumes is a binary value that is base 64 encoded. However, other binary to string encoding schemes can be used:

Check="3327862040FFshYQU167gNZyuT5eCouVqA==">

The exemplary pseudo code further illustrates a manifest 34 that includes multiple items associated with a container item 94, multiple revisions to an item (an image in the illustrative example), and a structure for the organizer and bookshelf root categories 90 described above. The manifest further illustrates a backup queue. This is a '|' (pipe character) delimited list of item IDs.

```
<Manifest Version="AV1"
ID="c895e151-dcf4-4c95-9660-41002b21f229"
Title="Sample Archive"
Check="3327862040FFshYQU167gNZyuT5eCouVqA==">
   <Items>
      <Container ID="Mom.containerx" Name="Mom" Impt="5/2/2006
3:25:04 PM" Bkup="6/20/2006 12:27:55 PM" Rate="0" Prn="False"
Cat="Family" />
      <Image ID="DSCF1426 (rev 1)" Name="Father and son"
Impt="5/2/2006 3:25:44 PM" Bkup="6/20/2006 12:27:55 PM" Rate="3"
Prn="False" Med="Simple|2004|7|20|15|0|44|362">
         <Rev Act="True" Org="True" Prt="True" Fil="DSCF1426 (rev 1)
(rev 1).jpg" W="983" H="1280" Rev="1" />
      </Image>
      <Image ID="DSCF1625" Name="Evening at park" Impt="5/2/2006
3:25:46 PM" Bkup="6/20/2006 12:27:55 PM" Rate="3" Prn="True"
Med="Simple|2004|8|2|20|20|6|0">
         <Desc>This image demonstrates the use of the lighting
adjustment tools to enhance the contrast and bring out the reds
and blues in the sky.</Desc>
         <Rev Act="False" Org="True" Prt="True" Fil="DSCF1625 (rev
1).jpg" W="1600" H="1200" Rev="1" />
         <Rev Act="True" Org="False" Prt="True" Fil="DSCF1625 (rev
2).jpg" W="1400" H="933" Rev="2" />
      </Image>
   ...
   </Items>
      <BackupQueues NextSet="3">
<Queue NextID="46" QueueType="DiskSet" SetID="1"
AutoUpdate="False" LastLocation="" LastTransaction="G0001-01-01-
00-00-00-000">
         <Queued>DSC_2555|DSC_2556|DSC_2513|
         DSC_2514SC_2953</Queued>
         <Deleted> DSC_1555.jpg |DSC_1556.jpg</Deleted>
      </Queue>
<Queue NextID="27" QueueType="ShadowCopy" SetID="2"
AutoUpdate="True" LastLocation="F:\Backup\Family Archive Shadow"
      LastTransaction="G2006-04-01-21-41-32-000" />
   </BackupQueues>
      <Organizer>
         <Category Name="My Sort Boxes" TagType="Folder">
         <Category Name="Events" TagType="Folder" />
<Category Name="Family" TagType="Folder"
/>...</Category></Organizer>
      <Bookshelf>
         <Category Name="My Bookshelves" TagType="Folder">
         <Category Name="Birthdays" TagType="Folder" />
<Category Name="Weddings" TagType="Folder"
/>...</Category></Bookshelf>
</Manifest>
```

In general, there are four main sections to the exemplary manifest code. The first section is the main manifest tag. The main manifest tag contains the identity of the archive 10 in addition to the checksum and ID information. The next section is the item list. The item list is the list of contents stored in the archive. The next section of the manifest code is the backup queue section. The manifest 34 may support a plurality of backup queues 86. As illustrated, there are two backup queues, including a first backup queue directed to implement backups onto a CD/DVD media device, and a second backup queue directed to implement backups via a shadow copy. The operation and implementation of backup queues is described in further detail herein. The last main section of the exemplary manifest code describes the set of user defined categories used to organize the items stored in the archive 10, which are also described in greater detail herein.

As noted above, each root category 90 or subcategory 92 may have zero to a plurality of containers 94. As an additional example, a pseudo code for an exemplary container file format is provided below. This code may comprise an extension of the manifest code illustrated above. In the example, a Category 90 named "Memorabilia" has a Container 94 named "Artwork". There are two exemplary item IDs associated with the Artwork container.

```
<Container Name="Artwork" Notes=""
Category="Memorabilia">
   <Item Id="handart" />
   <Item Id="Indianart" />
   ...
</Container>
```

As noted above, there may be two or more container types, e.g., folders and albums. Below is an example of an album, which is named "Sample Album" that is in a Category of "Other". The exemplary album shows the name of the album and the last known category in which, it was located, an (optionally ordered) list of item IDs and journal boxes. The example further shows a journal box entry with GUID, title, body text, formatting information, and the use of 'UseDefaults' flags, which if set, ignore local formatting information and use the application journal box defaults.

```
<Album Title="Sample Album" Description="" Category="Other">
   <Entries>
      <Journal Id="8aaedd9e-9881-403d-9a12-bd2883509c4c" Title="My
Sample Album" UseDefaults="True" TitleFont="" BodyFont=""
IsPortrait="True" ShowBorder="False" BackColor="#0,0,0"
ForeColor="#0,0,0" BorderColor="#0,0,0" Alignment="Center">
         <Journal>This album presents...</Journal>
      </Journal>
      <Item ItemId="DSC_0334 (rev 2)" />
      <Item ItemId="LC-2004-01-28 193638" />
      ...
   </Entries>
</Album>
```

As the examples illustrate, collection items can be used to 'group' items together. The 'category' field in the collection maps the categories described in the manifest 34.

The organization of the items in the archive storage area 30 may be described via the manifest 34 without requiring a database, e.g., by storing relevant information in an XML (or other open standard) manifest of the archive. Moreover, all associated files may be open standard formats. For example, the manifest 34, including any files, such as container files (albums and folders, etc.,) may be implemented in XML. Further, sort box and bookshelf information may be stored in the container items 94. Also as noted above, item IDs may be created as a function of the original item's filename. Item revisions may be named, for example, using a function of the item's ID and the revision number. In this regard, much of the manifest information can be recovered or rebuilt from the archive storage directory structure, filenames, and file content should the manifest 34 become lost, corrupt, damaged, etc.

One way to preserve the integrity of stored items is to make frequent backup copies of the items that have changed. Referring back to FIG. 5, the manifest 34 may have one or more backup queues 86. A backup queue 86 is a list of items in the archive storage area 30 that meet predetermined backup criteria for that queue. For example, a backup queue may queue up items that have been changed or that have not yet been backed up. Under appropriate conditions, the archive service 38 implements a backup of the items in the corresponding backup queue 86 to a designated device.

Figure 7:
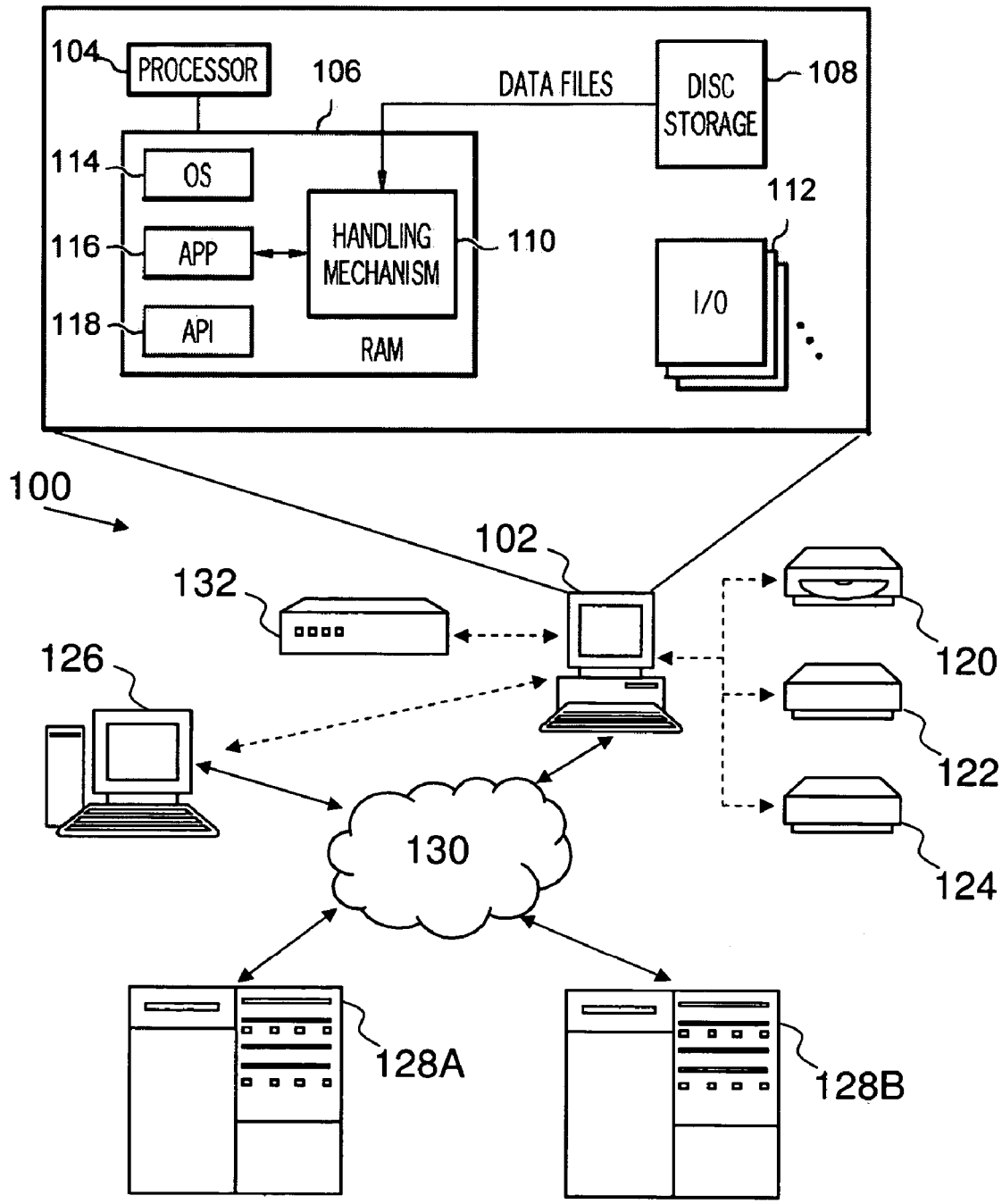
FIG. 7 is a schematic representation of a computer system that may be utilized to support an archive according to aspects of the present invention.

Referring to FIG. 7, a representative computer system 100 is illustrated in which an archive 10 may be created, accessed and utilized to collect, store, organize, archive, catalog, retrieve and/or manage digital content. The system 100 comprises a host processing device 102 upon which a user interacts with the archive storage area 30. A representative host processing device 102 may comprise, for example, a general purpose personal computer (PC), server, notebook computer, appliance or pervasive computing device, such as a personal data assistant (PDA), palm computer, cellular access processing device or other suitable device capable of supporting or otherwise interacting with the archive 10.

The host processing device 102 typically includes at least one processor 104 for executing software code including the archive service 38. The processing device 102 also includes system memory 106, such as random access memory (RAM) for temporarily storing software code that is being executed by the processor 102. The manifest 34 is also loaded into system memory 106. According to one aspect of the present invention, the entire manifest 34 may be loaded into system memory 106 during operation of the archive service 34. Putting the entire manifest 34 into system memory 106 allows the archive service 38 the capability of quickly locating, accessing and otherwise operating on the archive storage, including saving the manifest itself.

The processing device 102 also comprises disk or other permanent storage 108 for storing files of information including software applications, data files etc., a handling mechanism 110, which is typically provided to facilitate communication between the system memory 106 and the permanent storage 108 and a plurality of input output devices (I/O) devices 112, which allow external devices to communicate with the processor 104. The processing device 102 further includes suitable software including an operating system 114 and one or more applications 116, which are typically stored in the permanent storage 108 and are temporarily copied into the system memory 106 for execution. The processing device 102 may also include an application programming interface (API) 118 as well as any additional hardware and/or software as necessary for operation as is well understood in the art.

The host processing device 102 may have permanent or temporary access to additional storage devices, such as a compact disk (CD)/Digital Video Disk (DVD) burner 120 and/or one or more storage devices 122, 124, such as zip drives, USB drives, Firewire drives, compact flash drives and other internally mounted or externally connected devices.

The system 100 may further include one or more processing devices 126, e.g., computers that are connected to the host processing device 102 by a local network, peer to peer network, wireless, infrared or other by using any other suitable communications interface and corresponding technology. Additionally, the host processing device 102 may communicate to one or more server computers 128A-128B, e.g., by connecting across a network 130, such as the Internet. For example, the I/O devices 112 may include a network interface that includes hardware and/or software for communicating across the network 130.

The (entire) manifest 34 and the archive service 38 are loaded into the system memory 106 of the host processing device 102 during operation of the archive 10. The archive storage area 30 and corresponding items may be stored, for example, in the disk storage 108. When a user 40, 42, 44, 46, 48 requests access to an item in the archive storage area 30, the archive service 38 locates the item using the item index 82 in the manifest 34 and the corresponding item is retrieved, stored etc. depending upon the intended operation. Because the entire manifest 34 may be loaded into system memory 106, retrieval, storage and updating can be accomplished in a quick and efficient manner.

As noted above, the manifest 34 supports multiple backup queues 86. As one example, a first backup queue can be designated as a CD/DVD backup queue. Under this arrangement, the archive service 38 periodically writes copies of the items identified in that backup queue to the specified CD/DVD drive, e.g., drive 120. For example, the backup queue which is targeted to a CD/DVD will move a block of files identified in the CD/DVD backup queue to the CD/DVD drive 120 when the user places an appropriate media device, e.g., a blank or otherwise writable CD/DVD in the drive 120. As an alternative, the archive service 38 may schedule routine backup times or other suitable triggering events and/or conditions can be identified and defined. If there is information in the backup queue at the designated backup time, the archive service 38 notifies the user that a backup operation is recommended. The user may opt to proceed with the backup or ignore or otherwise delay the backup. If the user does not complete the backup operation, the CD/DVD backup queue will continue to accumulate backup information until a successful backup operation is implemented to an appropriate CD or DVD media.

As another example, a second backup queue can be designates as a shadow copy queue. A backup queue targeted to a shadow copy moves files to a replica of the archive storage area 30. The shadow copy may be located elsewhere on the disk storage 108. As a further example, the shadow copy may reside on one or more of the devices 122, 124, 126. If the shadow copy is written to a swappable or otherwise removable media, e.g., a USB or compact flash drive, and the device is not available at the scheduled or otherwise intended backup time, the shadow copy queue 86 may continue to log information until a successful backup can be completed, in a manner analogous to that described above.

As a further example, a shadow backup queue 86 could back up to a storage space on a remote server, e.g., the server 128A, which may comprise a dedicated archive protection appliance. This archive protection appliance may provide a simple and easy to understand device that works with the shadow backup queue.

Still further, there can be a plurality of backup queues, each with a different destination and a different set of guidelines as to when (and/or what content) to back up. For example, a first backup queue 86 may be configured to perform a weekly backup to storage on a first server 128A. A second backup queue 86 may be configured to perform a monthly backup to storage on a second server 128B. Still further, additional backup queues 86 may be set up to periodically back up to a DVD or CD via drive 120, an additional backup queue 86 could be set up to perform yet a different backup to a removable media on device 122, 124 and yet a further backup could be made to a shadow area designated on the disk storage 108 internal to the host processor 102 or to device 126.

The backup queue operation may be performed automatically whenever a triggering event or condition occurs, e.g., a programmed time period has elapsed, a corresponding application shuts down, a file or predetermined number of files have changed, been moved, created, removed, etc. If the backup copy location is temporarily unavailable, the corresponding backup queue continues to maintain and grow as necessary, the corresponding backup information until that backup copy location becomes available.

Whenever an item is changed, created, removed or otherwise satisfies predefined criteria for backup, it may be listed in one or more (including all) of the corresponding backup queues 86. Item references are removed from each backup queue 86 whenever a backup operation that saved that item is totally complete. As one example, the entire backup operation corresponding to backing up all items in a particular backup queue 86 is an atomic level operation, such that all items are backed up successfully in a given operation, or no items are removed from the corresponding backup queue.

There are a number of schemes that can be implemented for administering the backup queues. For example, as noted above, items that are changed may be automatically queued for backup, including queuing the changed item in every established backup queue 86. In this exemplary configuration, items are backed up in the order they were queued for backup. If any part of an item requires backup, then the entire item is backed up. As another example, users may also be able to explicitly add and remove items queued for backup. Moreover, users may be prompted to backup items on startup of the archive service 38, if, for example, a threshold number of megabytes or a threshold number of items require backup. Under this arrangement, the user may be able to set the appropriate thresholds. As yet another example, the user may be provided with the option to backup the entire archive 10.

Each backup may also comprise, for example, a copy of the manifest 34 and/or a backup queue content file (XML) that lists the items on the backup.

As an alternative to maintaining the archive storage area 30 on the disk storage 108 of the host processing device 102, the host computer may be coupled to a remote storage appliance (dedicated storage device), such as a media system 132. The media system 132 is a separate storage device, and may be a turnkey system or general purpose system that supports the archive storage area 30. The media system 132 may serve as the central storage, archival and retrieval system for a home multimedia center, thus alleviating the burdens on the host computer 102 for storing the items in the archive storage. A large range of dedicated network/line attached archive devices may be utilized with the various aspects of the archive storage area 30.

Items within the archive storage area 30 may be viewed using a suitable library application that interacts with the archive service 38. The library may be organized using an organizer panel, which contains sort boxes and folders, e.g., which themselves may be saved, as items within the archive storage area 30. For example, sort boxes may contain folder items that classify digital content items in a predefined manner.

Figure 8:
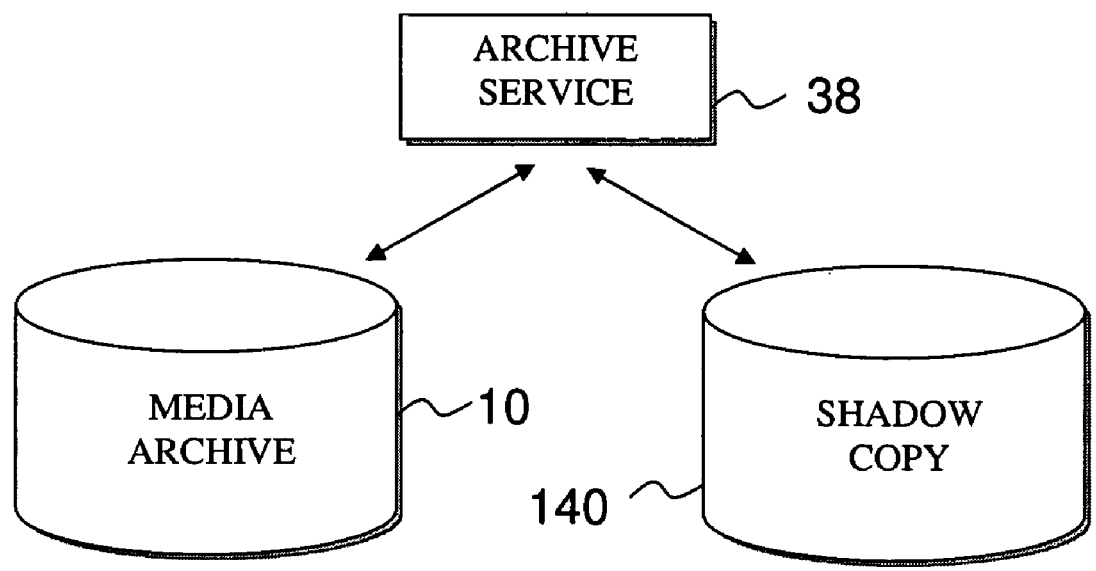
FIG. 8 is a block diagram of the media archive and a shadow copy of the archive.

Referring to FIG. 8, the archive service 38 can effectively manage the archive 10 as well as maintain one or more shadow copies 140 of the archive. One of the backup queues 86 may be utilized to define and manage the shadow copy 140, e.g., which may be provided on a permanently accessible location, e.g., a hard drive, media system etc. or an intermittent connection such as a Universal Serial Bus or Network connection, etc. According to an aspect of the present invention, the shadow copy 140 contains a replication of the archive contents, including the archive storage area 30, manifest 34 and other support files. Additionally, the shadow copy 140 may comprise a marker file or other additional information that maintains a reference to the original archive 10. Still further, as noted above, multiple shadow copies 140 may be maintained, e.g., in a grandfathering or other arrangement where multiple iterations or different previous versions of the archive are saved in each shadow copy 140.

Figure 9:
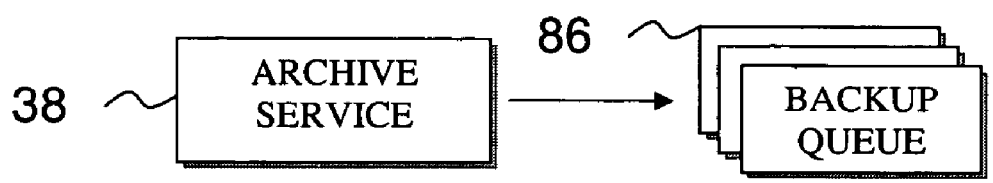
FIG. 9 is a block diagram of the archive service operating on multiple backup queues.

With reference to FIG. 9, as noted in greater detail herein, the archive service 38 may be configured such that every event that is to be backed up is sent to every backup queue 86. As such, every item that is added, removed and/or updated is also updated in each backup queue 86.

It is also possible to have different rules and operations when backing up to different backup queues 86. For example, it may be useful to establish different rules for backing up to a CD/DVD backup compared to a shadow copy. For example, when backing up to a CD/DVD, for each item added or updated, the corresponding item ID or other suitable indicator may be placed at the front of the CD/DVD backup queue 86. Events designating that one or more items have been removed from the archive storage area 30 may be ignored. Under this arrangement, CD/DVD items are copied to the backup media (writable CD or DVD) in the order they appear in the CD/DVD backup queue 86. If the next item is too large to fit onto the media, the next item in the CD/DVD backup queue 86 may be tried, etc. This process may continue until all queued items are suitably backed up, across one or more CD/DVD media disks. Further, the complete manifest may be copied to each CD or DVD media disk if multiple media disks are required for the backup. Still further, a content file, e.g., containing a list of items on the backup may be copied to each media disk, and/or each media disk may receive a unique content file of the contents on that media disk.

In an exemplary implementation of a shadow copy backup queue 86, for each item added or updated in the archive 10, the corresponding item ID or other suitable indicator may be queued in a "changed archive items list" of the shadow copy backup queue 86 to identify items that have changed. Further items that have been removed from the archive 10 may be added to a "deleted files list" of the shadow copy backup queue 86. Accordingly, on a shadow copy update, deleted files may be removed from the shadow copy first. Then, the files from the changed archive items list may be copied to the shadow copy. Files that have not changed since the last backup may be skipped. Further, the complete manifest may be copied to the shadow copy for each update operation.

As noted above, tools may be provided to assist a user in retrieving items from the archive storage area 30. Some additional examples of search and retrieval tools are illustrated below. As an illustrative example, content items may be rated and sorted based upon ratings, such as a five-star rating system or other arbitrary classification technique that may be used to provide an additional view or views into the content of the items stored in the archive storage area 30, e.g., by setting up the appropriate categories and containers 90, 92, 94.

Still further, as noted above, containers may comprise folders or albums and/or other suitable organizational metaphor(s). Albums may be useful, for example, in the context of images, to tell a story of a collection of images. Journal entries and other additional content may be added to the album to preserve information as noted in the exemplary code provided in greater detail herein.

A date and time may be assigned to each item of content stored in the archive storage area 30. Dates and times assigned to each item of content may be precise or fuzzy. For example, months can be specified by number, accepted abbreviations full name, etc. The archive service 38 may assign an item to a position in a time based upon its time and/or date or date(s) or date range(s). The specific implementation for the conversion of fuzzy time and date entries can vary. However, by way of example, a user may enter: "sometime in 1972". In response thereto, the archive service 38 may translate this to Jan. 1, 1972-Dec. 31, 1972, etc.

As used herein, a fuzzy date is a date that covers an arbitrary range of dates and/or times. For example, a user may not know the date of an old picture, video clip or musical arrangement. Moreover, a user may want to assign an arbitrary date to an item. Content items may be dated based upon the date that the content was created, the date added to the archive or any arbitrary date assigned by the user. For example, a photograph of a historical landmark may be dated corresponding to a historical period, e.g., a picture of Stonehenge could be classified based upon a date that the photograph was taken, or upon an approximation of the date that Stonehenge was built. Still further, once a date is associated with an item, the date may be broadened, narrowed, etc.

As another example, a video clip may be taken of the battlefield of Gettysburg during a tour of the field during the summer of 2006. However, the user may want to date the footage based upon the date of the Civil War battle, e.g., summer of 1863. Further, the exact date and time of an item may not be known and may never be known. Although, it is possible that additional refinements of the date may be possible in the future as more information become available.

The dating system may also allow for the specification of holidays and seasons. The exact date of some holidays may vary from year to year (ex: lunar calendar holidays like Easter and Passover) so the application has to know how to calculate these variable holidays. It also allows for the user to specify other fuzzy notations, such as seasons, ex: summer, summer vacation, the hot season, etc. The dating system may also allow for circa or 'about' dates. These are extra ranges around another date. For example: 'circa the summer of 1970' may mean an actual date range greater than just the 'summer of 1970'. The user may also be able to specify the meaning of words like 'summer' or 'about' to user defined ranges. Moreover, time and date information may be influenced by geography, e.g., which may allow for the automatic setting of some information based on the geographic information know about an image. For example: "summer" for a picture taken in Florida may have a defined time range that is different from a time range for "summer" associated with a picture taken in Canada.

As a few illustrative examples, if a user enters Jan. 14, 1972 3:00 PM, a time code of Jan. 14, 1972, 15:00 hours may be associated with a corresponding item. As another example, if a user enters Autumn (or fall) 1942, a time code of Sep. 1, 1942 thorough Nov. 30, 1942 may be associated with a corresponding item. As yet a further example, if a user enters early 1977, a time code of Jan. 1, 1977 through Jun. 30, 1977 may be associated with a corresponding item.

Item content may be viewed by time/date using a time/date scaling feature. The time/date scale provides a sliding scale that allows a user to search through content items that have been classified by time/date, e.g., by traversing forwards and backwards along an appropriate scale, thus allowing a user to view both older and newer content in different ways.

Figure 10:
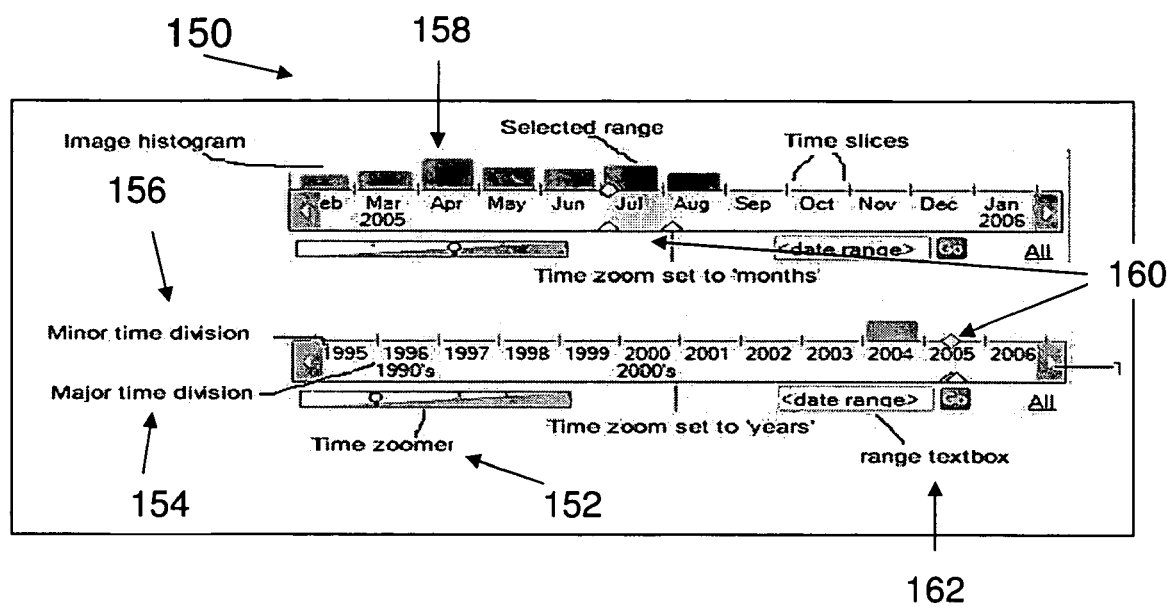
FIG. 10 is an exemplary timeline control which may be used to retrieve and locate items stored within the archive.

Referring to FIG. 10, the archive service 138 may provide a timescale control 150 that is designed to allow the user to visualize different amounts of time and to change these view very rapidly. The items in the archive storage area 30 are identified by time/date, which, as noted above, can be precise or fuzzy, and are associated with the timescale control to allow a user to quickly perform chronologically based searches for archive content. In one exemplary implementation, this scale is determined by an internal variable that defines the number of seconds each pixel on the screen represents; call the 'pixelseconds'.

The user is shown the current pixelseconds on a notched slider or other suitable visual icon. The user can slide the slider 152 to select the required timescale. For example, the slider 152 may be notched with the pixelsecond settings, such as for centuries, decades, years, months, weeks, days, etc. A single mouse click may also be used to snap the pixelsecond settings to the closest notch. The timescale windows update as the slider 150 is moving. The results is that the user gets the visual experience of zooming in and out of time.

As shown in the exemplary implementations of the timescale control 150, the scale is broken into a set of contiguous time slices. The major and minor time division displays 154, 156 are automatically set so the time slices stays within a minimum and maximum number of pixels. The major time division 154 may only be shown when it first appears and when it changes. The minor time division 156 may be shown for each time slice. The list below shows exemplary time divisions. The divisions are spaced so that one division is roughly 2-3 times the size of the previous division:

Second, 5 Seconds, 15 Seconds, 30 Seconds,
Minute, 5 Minutes, 15 Minutes, 30 Minutes,
Hour, 3 Hours, 6 Hours, 12 Hours,
Day, 3 Days, Week, 2 Weeks,
Month, 3 Months, 6 Months, Year,
2 Years, 5 Years, Decade, 2 Decades,
5 Decades, Century This wide range of time divisions allows for it being used to mark everything from major historical periods down to a set of frames inside a video clip. For example, the exemplary ranges can be used to show how still pictures and video sequences are intermixed in time as well as how images are spread over the lifespan of a person.

A histogram 158 or other visual presentation, as shown across the top of the timeline, may be used to show the number of items in the archive storage area 30 from the current query that is found within that specified time/date slice. The currently displayed (or selected) part of the query may be shown, for example, in darker color or other visually distinguishing manner. As one illustrative example, if the selected range encloses the entire slice then its histogram bar may be drawn in a solid darker color. If the selected range starts or ends in a slice then a fade in or fade out is used to show that the selected range either starts in or ends in the slice.

The user can change the selected range by grabbing and sliding an appropriate tab 160 or other icon provided on the timescale 150. A user may alternatively select a date range by entering a (specific or fuzzy) date specification in a suitable textbox 162 and by clicking 'go' or any other suitable control. The user may also be able to select all dates, e.g., by clicking on an 'All' or other suitable link. The user can scroll the visible date range by using the side arrows or click and drag the time scale background. A click without dragging may be used, for example, to select the specified time slice. The control key thus allows the user to select a range of dates on the mouse click.

When the timescale zoom or visible range changes the application is requested to recalculate the histogram values. The control is redrawn immediately and then again when the recalculate is complete. When a slice is drawn, the histogram is not drawn if there are no data available. The old values may be maintained as temporary values for drawing until the new histogram values are available. A tab or other visual icon may be used to show the date of the item or items that are displayed to the user, and which satisfy the specified time/date search parameters. The user can slide this value directly. Or, it is updated if the user scrolls a query results or other item view listing provided in cooperation with the timescale control.

Clicking on the center bar adjusts the display so the center of the selected range is over the center of the control. This centering capability works well with timescale zooming since the zoom keeps the center date constant.

As will be appreciated by one skilled in the art, the present invention may be embodied as a computer method, a system or computer program product on a computer-usable storage medium having computer-usable program code embodied in the medium. The software aspects of the present invention may be stored, implemented and/or distributed on any suitable computer usable or computer readable medium(s), including but not limited to, any medium that can contain, store, communicate, propagate or transport the program for use by or in connection with an instruction execution system of a corresponding processing device. The computer program product embodiments of the present invention may each have computer usable or computer readable program code portions thereof, which are stored together or distributed, either spatially or temporally across one or more devices. A computer-usable or computer-readable medium may comprise, for example, an electronic, magnetic, optical, electromagnetic, infrared, semiconductor system, etc., apparatus, device, or propagation medium.

More specific examples of the computer usable or computer readable medium comprise an electrical connection having one or more wires, swappable intermediate storage mediums such as floppy drives, tape drives or external hard drives a portable computer diskette, a hard disk, a random access memory (RAM), a read-only memory (ROM), an erasable programmable read-only memory (EPROM or Flash memory), an optical fiber, a portable compact disc read-only memory (CD-ROM) or digital video disk (DVD), an optical storage device, a transmission media such as those supporting the Internet or an intranet, or a magnetic storage device. The computer-usable or computer-readable medium may also comprise paper or another suitable medium upon which the program is printed, as the program can be electronically captured, for example, via optical scanning of the paper or other medium, then compiled, interpreted, or otherwise processed in a suitable manner, if necessary, and then stored in a computer memory.

In the context of this document, a computer-usable or computer-readable medium may be any medium that can contain, store, communicate, propagate, or transport the program for use by or in connection with an instruction execution system, apparatus, or device. The computer-usable medium may include a propagated data signal with the computer-usable program code embodied therewith, either in baseband or as part of a carrier wave or a carrier signal. The computer usable program code may also be transmitted using any appropriate medium, including but not limited to the Internet, wireline, optical fiber cable, RF, etc.

Computer program code for carrying out operations of the present invention may be written in any suitable language, including for example, an object oriented programming language such as Java, C++ or the like. The computer programs code for carrying out operations of the present invention may also be written in conventional procedural programming languages, such as the "C" programming.language, or in higher or lower level programming languages. The program code may execute entirely on a first computer, partly on one or more different computers, partly on the first computer and partly on a remote computer or entirely on the remote computer or server. In the latter scenario, the remote computer may be connected to the first computer through a network such as a local area network (LAN), a wide area network (WAN), or the connection may be made to the remote computer, for example, through the Internet using an Internet Service Provider or other suitable means of communicating across the Internet.

The present invention is described herein with reference to flowchart illustrations and/or block diagrams of methods, apparatus systems and computer program products according to embodiments of the invention. It will be understood that each block of the flowchart illustrations and/or block diagrams, and combinations of blocks in the flowchart illustrations and/or block diagrams may be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The present invention may be practiced on any form of computer system, including a stand alone computer or one or more processors participating on a distributed network of computers. Thus, computer systems programmed with instructions embodying the methods disclosed herein, or computer systems programmed to perform various aspects of the present invention and storage or storing media that store computer readable instructions for converting a general purpose computer into a system based upon the various aspects of the present invention disclosed herein, are also considered to be within the scope of the present invention. Once a computer is programmed to implement the various aspects of the present invention, including the methods of use as set out herein, such computer in effect, becomes a special purpose computer particular to the methods and program structures of this invention. The techniques necessary for this are well known to those skilled in the art of computer systems.

Other computer system configurations can also be employed to perform the method of this invention, and to the extent that a particular system configuration is capable of performing the method of this invention, it is equivalent to the representative computer system and within the scope of this invention.

The flowchart and block diagrams in the Figures and code examples provided in the specification illustrate the architecture, functionality,. and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions may occur out of the illustrated order. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to preferred embodiments thereof, it will be apparent that modifications and variations are possible without departing from the scope of the invention defined in the appended claims.

What is claimed is:

1. A computer program product to archive digital content comprising:
    a computer usable storage medium having computer usable program code embodied therewith, the computer usable program code comprising:
    computer usable program code configured to implement an archive storage area having a unified storage structure including a unitary archive folder such that all items stored in the archive storage are logically contained within said unitary archive folder;
    computer usable program code configured to implement a manifest that is stored within said archive storage area when said archive storage area is loaded onto a storage device, said manifest comprising:
        an index of items stored in said unified structure of said archive;
        an organizational structure that supports user-defined categories that perform at least one of: characterizing, customizing and classifying, items stored in said unified structure; and
        at least one backup queue that temporarily queues a list of items that satisfy predetermined backup criteria but have not been backed up; and
    computer usable program code configured to implement an archive service that:
        intermediates between software modules and said archive storage area to control requests for access to items stored in said unified storage structure by interacting with and correspondingly updating said index of said manifest as items are retrieved and stored in said unified storage structure;
        provides an interface that interacts with a user to manipulate and interact with said organizational structure to define user-defined views of the contents of said unified storage structure; and
        interacts with each backup queue to back up items stored in said archive storage area at predetermined times based upon predetermined backup criteria for each of each backup queue.

2. The computer program product according to claim 1, wherein:
    said unified storage structure comprises a hashed directory structure; and
    said manifest stores a hashing modulus of a corresponding to hash function.

3. The computer program product according to claim 1, wherein said archive storage area is marked as a special directory by at least one of an information file saved in said archive storage area or a shell extension of an operating system on a corresponding computing device upon which said system is loaded.

4. The computer program product according to claim 1, wherein said manifest is constructed in the extended markup language.

5. The computer program product according to claim 1, wherein said at least one backup queue comprises a first backup queue that said archive service utilizes to back up information to a removable media device and a second backup queue that said archive service utilizes to back up information to a shadow copy.

6. The computer program product according to claim 5, wherein said first backup queue backs up to at least one of a compact disk or a digital video disk drive.

7. The computer program product according to claim 1, wherein said archive storage area is stored on a storage appliance that is communicably coupled to a host computer.

8. The computer program product according to claim 1, wherein said interface of said archive service implements at least one of visualization and browsing of said organizational structure to provide at least one view of the items stored in the archive storage area for user-implemented location of items of interest within the archive storage area.

9. The computer program product according to claim 1, wherein said archive service a further provides a user-interactive time control that implements fuzzy dates and times to allow a user to locate items of interest within said archive storage area, and fuzzy date parameters that support said time control are stored in said manifest.

10. A method of archiving digital content comprising:
    creating an archive storage area stored within at least one storage device accessible by a host processing device, having a unified storage structure including a unitary archive folder such that all items stored in the archive storage are logically contained within said unitary archive folder;

maintaining a manifest executed by said host processing device, comprising:

maintaining in said manifest, an index of items in said unified structure of said archive;

maintaining in said manifest an organizational structure that supports user-defined categories that perform at least one of: characterizing, customizing and classifying, items stored in said unified structure; and maintaining in said manifest at least one backup queue that temporarily queues a list of items that satisfy predetermined backup criteria but have not been backed up;

providing an archive service that, when executed by said host processing device, performs:

intermediating between users and said archive storage area to control requests for access to items stored in said unified storage structure by interacting with and correspondingly updating said index of said manifest as items are retrieved and stored in said unified storage structure;

providing an interface that interacts with a user to manipulate and interact with said organizational structure to define user-defined views of the contents of said unified storage structure; and interacting with each backup queue to back up items stored in said archive storage area at predetermined times based upon predetermined backup criteria for each of each backup queue.

11. The method according to claim 10, wherein:

said creating an archive storage area having a unified storage structure comprises:

implementing said unified storage structure by creating a hashed directory structure; and said maintaining a manifest stored within said archive storage area comprises:

storing a hashing modulus of a corresponding to hash function within said manifest.

12. The method according to claim 10, further comprising marking said archive storage area as a special directory by at least one of storing an information file in said archive storage area or utilizing a shell extension of an operating system on a corresponding computing device.

13. The method according to claim 10, wherein said maintaining a manifest comprises creating said manifest using the extended markup language.

14. The method according to claim 10, wherein said maintaining in said manifest, at least one backup queue that temporarily queues a list of items that satisfy predetermined backup criteria but have not been backed up comprises:

maintaining a plurality of backup queues, each having a predefined backup location and backup parameters.

15. The method according to claim 14, wherein said maintaining a plurality of backup queues, each having a predefined backup location and backup parameters comprises:

maintaining at least one backup queue that backs up to a portable removable media device; and maintaining at least one shadow copy queue that backs up to a shadow copy of said archive.

16. The method according to claim 10, further comprising:

storing said archive storage area on a storage appliance that is remote from a host computer that executes said archive service.

17. The method according to claim 10, further comprising:

utilizing said organizational structure to provide a visualization of the items stored in said archive storage area to allow a user to locate items of interest.

18. The method according to claim 1, further comprising:

utilizing a time control that implements fuzzy dates and times to allow a user to locate items of interest within said archive storage area; and storing fuzzy date parameters that support said time control in said manifest.

19. The computer program product according to claim 1, further comprising:

computer usable program code configured to implement a message digest of item list information and secret information to throttle archive storage usage based on an activation state for tamper prevention of said archive storage area.

20. The method according to claim 10, further comprising:

implementing a message digest of item list information and secret information to throttle archive storage usage based on an activation state for tamper prevention of said archive storage area.

\* \* \* \* \*

UNITED STATES PATENT AND TRADEMARK OFFICE
CERTIFICATE OF CORRECTION

| | | |
|---|---|---|
| PATENT NO. | : 7,685,175 B2 | |
| APPLICATION NO. | : 11/502097 | |
| DATED | : March 23, 2010 | |
| INVENTOR(S) | : Michael Lee Carroll and Paul Thomas Schweizer | |

It is certified that error appears in the above-identified patent and that said Letters Patent is hereby corrected as shown below:

Column 3, line 13, "information 20 and other sources 24." should read --information 22 and other sources 24.--;

Column 5, line 4, "may be shared by loading Net" should read --may be shared by loading .Net--;

Column 9, line 3, "filed for purposes of. illustration." should read --filed for purposes of illustration.--;

Column 18, line 4, "The computer programs" should read --The computer program--;

Column 18, line 7, "such as the "C" programming.language," should read --such as the "C" programming language,--; and Column 19, line 11, "functionality,. and operation" should read --functionality, and operation--.

Signed and Sealed this
Second Day of August, 2011

David J. Kappos
*Director of the United States Patent and Trademark Office*